Patented Oct. 20, 1953

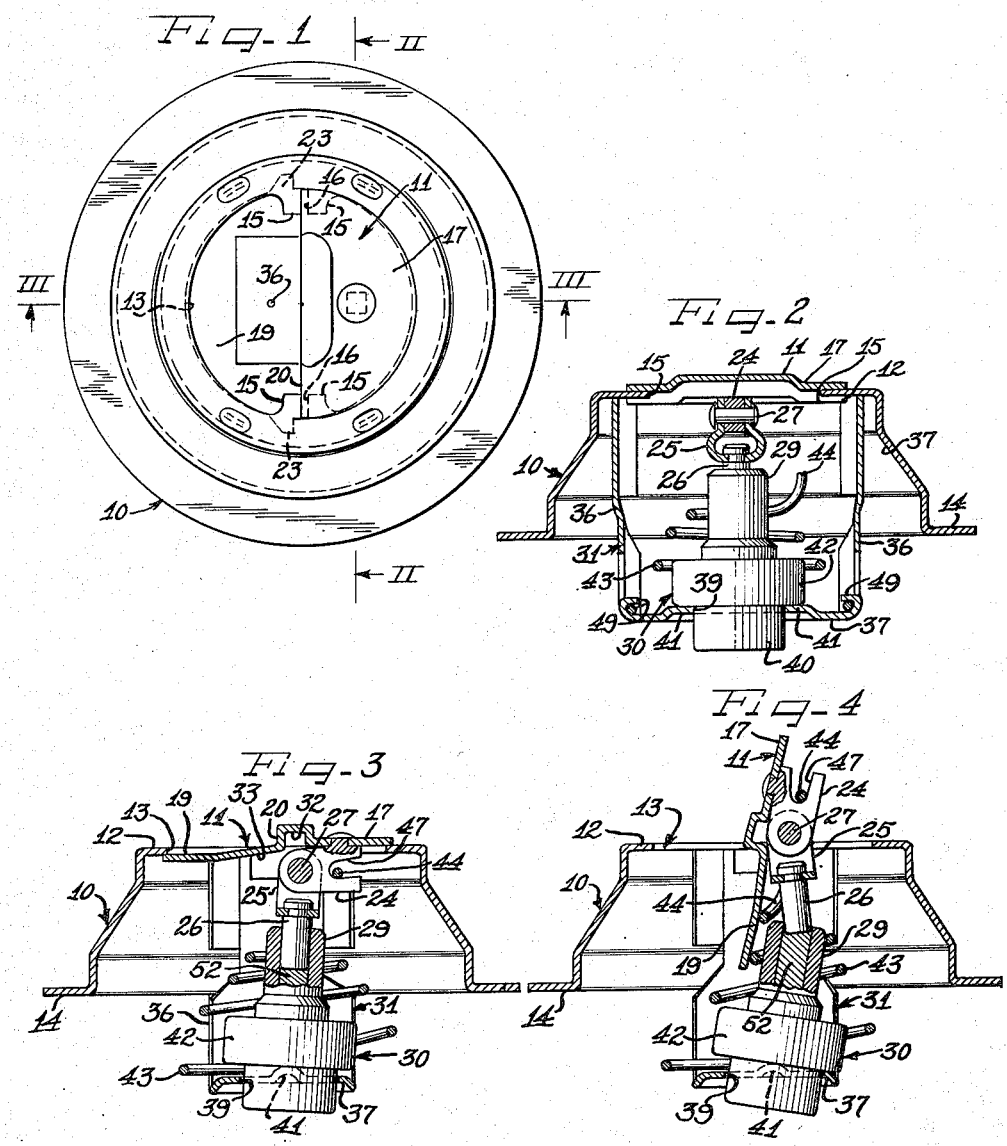

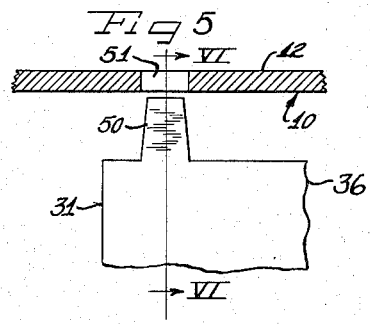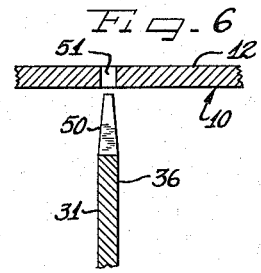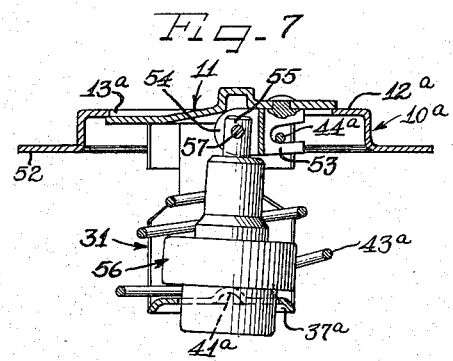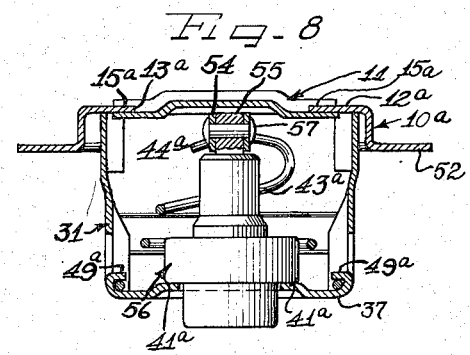

2,656,113

UNITED STATES PATENT OFFICE 2,656,113

THERMOSTATIC VALVE

Harold B. Drapeau, Oak Park, Ill., assignor to The Dole Valve Company, Chicago, Ill., a corporation of Illinois Application August 24, 1950, Serial No. 181,251

2 Claims. (Cl. 236—34)

This invention relates to improvements in thermostatically operated valves particularly adapted for use in cooling systems of automobiles.

An object of this invention is to provide an improved but simple butterfly type of thermostatically operated valves of a simpler, more compact and economical and efficient construction than formerly.

Another object of my invention is to provide a shaftless butterfly type of thermostatic valve having more effective sealing engagement with the edge of the valve opening when closed and having a simplified means for connecting the parts together to avoid the bleeding of liquid past the points of connection of the valve parts.

A still further object of my invention is to provide a thermostatically operated butterfly valve particularly adapted for use in cooling systems of internal combustion engines wherein the thermostat is of a type having a plunger extending therefrom and wherein the thermostat and valve and the connections thereto are so constructed and arranged that the valve will jackknife in the open position and will stay in such a position upon failure thereof.

In carrying out my invention I provide an annular valve casing and close one opening of the casing with a butterfly type valve and provide a valve cage forming a rocking support for a temperature responsive element connected to operate the valve and connect the cage to the casing by a tapered ear and slot connection so arranged as to prevent the bleeding of liquid thereby, and I also so arrange the temperature responsive element with respect to the valve that any failure of the valve will be in an open position.

These and other objects of my invention will appear from time to time as the following specification proceeds and with reference to the accompanying drawings wherein:

Figure 1 is a top plan view of a thermostatically operated butterfly valve constructed in accordance with my invention;

Figure 2 is a transverse sectional view of the valve taken substantially along line II—II of Figure 1;

Figure 3 is a transverse sectional view of the valve taken substantially along line III—III of Figure 1;

Figure 4 is a transverse sectional view of the valve taken along the same lines as Figure 3, but showing the valve jackknifed in open position, upon failure of the thermostatic element;

Figure 5 is an enlarged fragmentary view illustrating the tapered ear and slot connection between the valve casing and cage supporting the temperature responsive elements;

Figure 6 is a sectional view taken substantially along line VI—VI of Figure 5;

Figure 7 is a transverse sectional view taken through a valve constructed in accordance with my invention and showing a modified form in which my invention may be embodied; and Figure 8 is a vertical sectional view taken transversely of Figure 7.

In the embodiments of my invention illustrated in the drawings, an annular valve casing 10 is shown. This casing may be suitably attached in any desirable manner to a hose connection or water jacket structure of an internal combustion engine, through which cooling fluid is flowing, to control the temperature and flow of the cooling fluid by a valve indicated generally by reference character 11 and herein shown as being a butterfly type of valve. The casing 10 may be made from a metallic stamping, stamped from a sheet or plate of any suitable material, thus lending itself to large scale economical production. The casing 10 is herein shown as having a flat upper annular portion 12, the inner margin of which forms a valve opening 13 and also having a downwardly and outwardly extending frusto-conical wall portion with a lower outwardly projecting flange portion 14 which may seat against an end of a conduit or wall structure of the cooling system of the engine.

The valve opening 13, as shown in Figure 1, is of a generally circular form, divided into two halves, at the junction of which are spaced inwardly extending nibs 15—15. The spaces between said nibs form two slots 16—16 diametrically opposite each other and disposed in a straight line which defines generally the pivotal area of the valve 11.

The valve 11 may likewise comprise a metallic stamping and may be economically manufactured in suitable press equipment. The valve 11 may be somewhat similar to that shown in the Brown Patent No. 2,493,336 dated January 10, 1950 and comprises two laterally offset flat wing portions 17 and 19 extending in opposite directions from the center of the valve in parallel relation with respect to each other. These wing portions are connected together by an intermediate section 20 extending generally at right angles to the wing portions 17 and 19. The height of the intermediate right angled section is determined by the thickness of the annular portion of the casing defining the valve opening and is such that one wing portion 17 is disposed on the top side of the valve opening 11 and the other is disposed on the bottom side of the valve opening when the valve is closed, as shown in Figures 1 and 3. In addition, the overall area of the valve 11, which is generally of a disc-like form with the exception of the attaching means, is such that when the valve is in a closed position, as shown in Figures 1 and 3, it will extend beyond the edge of the valve opening and half of the top edge of the annular portion 12 defining the valve opening 13, and half of the bottom edge thereof, to close off the flow of fluid through said opening. Two ears 23—23 are herein shown as extending oppositely from the wing portion 19 of the valve 11 adjacent the right angled portion 20. These ears extend laterally beyond the margins of the valve opening 13 and are herein shown as abutting the bottom of the annular portion 12 defining the valve opening. The marginal edges of said ears come into engagement with the annular portion 12 upon complete opening of the valve to retain said valve in position.

The valve 11 may thus be inserted through the slots 16—16 from the bottom of the casing by first inserting the wing portion 17 through said slots until the right angled portion comes into engagement therewith. The valve may then be pivoted about this right angled portion into a closed position. In this manner, the valve may readily be inserted in the valve opening in a simple operation, it being understood that the inner margins of the slots 16—16 may extend inwardly of the periphery of the valve opening 13 so that the wing 17 will lap the top half of the annular surface 12 and the slots 16—16.

A connecting lug or ear 24 is shown in Figures 2, 3 and 4 as depending from the wing 17 and as extending transversely of the pivotal axis of the valve element 11. Said connecting ear may be secured to said valve element in a suitable manner, such as by riveting. A yoke 25, extending upwardly from a piston 26, is shown as being pivotally connected to the inner side of the ear 24. The yoke 25 extends along opposite sides of the ear 24 and may be snapped or sprung on a grooved upper portion of the piston 26 and pivotally mounted thereon. The piston 26 is in turn extensible from a cylinder 29 of a temperature sensitive element 30, herein shown as being rockingly mounted adjacent its lower end in a cage 31, as will hereinafter more clearly appear as the specification proceeds. The pivotal axis of the pin 27 is slightly offset laterally from the pivotal axis of the valve element 11 and is also offset inwardly thereof as may be seen with reference to Figure 3. The valve element 11 is provided with recessed portions 32 and 33 in the bottoms of the wing portions 17 and 19, respectively. These recessed portions may be formed in said wing portions by stamping to receive the yoke 25 and allow full opening of the valve element without interference between said yoke and valve element. These recessed portions are so arranged with respect to said yoke and ear that the piston 26 may jackknife with respect to said cylinder 29 to the position shown in Figure 4 when excessive temperatures are reached and the thermostat may fail.

A vent 36 is shown as extending through the wing 19 of the valve element. This vent is provided to permit the passage of air through said valve element so that the radiator may be filled when the valve is closed.

The cage 31 is herein shown as being of a generally U-shaped formation with parallel spaced side walls 36—36 extending upwardly from opposite sides of a bridge 37 of said cage and shown as conforming generally to the curvature of the casing 10. The cage 31 may likewise be made from a metal stamping. The bridge 37 has a central apertured portion 39 to receive a lower cylindrical portion 40 of the temperature responsive element 31. The bridge 37 is upset adjacent the margins of the openings 39 at diametrically opposed points during the stamping operation to form rounded bearing nibs 41—41 upon which rockingly rests an enlarged ring portion 42 of the temperature responsive element 39, enabling said temperature responsive element to rock and follow the ear 24 upon opening and closing of the valve. The bridge 37 also forms a seat for a coil spring 43, herein shown as being a conical spiral coiled spring of a relatively few convolutions, converging in diameter from the lower to the upper end thereof. The spring 43 has an integral upper hook portion 44 extending at right angles to the coils of the spring through an outwardly opening slot 47 formed in the ear 24. The hook 44 reacts against the slot 47 at a point offset laterally from the pivotal axis of the valve element 11 and maintains said valve element closed except when opened by the temperature responsive element 30. The spring 43 is held in position in its seat by means of two tabs 49—49 crimped over the bottom coil of said spring. Said tabs are herein shown as being formed by stamping from the walls 36—36 of the cage 31 and may be crimped over said spring when assembling the valve, thus forming a simple and efficient means for readily securing the spring to the cage, especially adapted to mass production methods.

The cage 31 is secured to the casing 10 by tapered ears 50—50 formed integrally with and extending upwardly from the vertical walls 36—36 of said cage. The ears 50—50 extend through rectangular slots 51—51 formed in the annular portion 12 of the casing 13, and the outer ends thereof may be spun or peened to entirely fill said slots with said ears and to firmly secure the cage 31 to said casing.

It should be noted that the ears 50—50 are tapered on all sides to converge at their upper ends, and when peened or spun to rivet said cage to said casing completely fill said slots, fully closing said slots and preventing the bleeding of liquid therethrough. This effects an inexpensive and leak-proof securing means for the cage 31 to the casing 10 which may readily and simply be assembled on a production basis.

The temperature responsive element 30 may be of a well known form of extensible power element type utilizing a temperature responsive element in the form of a preformed body contained in a casing, to extend a piston from a cylinder with a relatively high degree of pressure, as disclosed in Vernet Patent No. 2,259,846 dated October 21, 1941, or it may be composed of high molecular weight alkalines or similar substances intimately mixed together with finely divided heat conducting material contained in a casing, as disclosed in the Vernet Patent No. 2,368,181 dated January 30, 1945.

The spring 43 engaging the slot 47 at its end of smallest diameter and seated at its end of largest diameter on a bridge 37 and secured thereto by the tabs 49—49 crimped thereover is preloaded to bias the valve element 11 closed and since its point of connection to the valve element is spaced from the piston 26 toward the edge of the valve element, the leverage on the valve element increases as the valve is closed, giving the advantages of a more effective sealing pressure than heretofore. The spring 43 has relatively few turns in proportion to its length and is so calibrated and loaded and is connected to the valve element in such a location that upon engine temperatures of the boiling point of the liquid coolant in the cooling system the piston 26 is free to leave the cylinder 29 of the temperature sensitive element. When this occurs, the spring 43 will jackknife said piston with respect to said cylinder to a position like that shown in Figure 4 and freeze the valve in an open position. When this occurs, the entire valve must be removed and cannot be re-used unless repaired.

It should be noted with reference to Figure 4 that the spring 43 has a tilting action when jackknifed to an open position and that the tilting action thereof together with its conical form serves to limit the load reaction of the spring on the piston to a safe value. Also with said spring exerting a pressure on said valve near the nose or outer end thereof the valve seating pressure of the spring increases as the valve closes and the pressure exerted on the valve by the spring will automatically decrease as the valve opens, enabling a lighter spring to be used than formerly, and limiting the load reaction of the spring on the piston to a safe value as the valve moves to an open position.

The piston 26 may fit within the cylinder 29 relatively loosely to freely move along said cylinder and to move to the jackknifed or cocked position with respect to said cylinder when in the fully extended position shown in Figure 4.

It should here be noted that when the piston is in its fully extended position and the valve is fully opened that the offset or shouldered portion 20 thereof will rest on the top of the flat annular surface 12 and the ears 23—23 will engage the underside of said top surface, limiting movement of the valve beyond a fully open position. The yoke 25 will likewise be recessed within the recessed portion 33 of the wing 19, thus avoiding the tendency of said yoke to engage the wing 19 during extension of the piston 26 and limit opening movement of the valve and permitting sufficient movement of the piston and valve element to move into the jackknifed position shown in Figure 4.

While the spring 43 may be so loaded and calibrated as to allow the piston to leave the temperature responsive element at temperatures above the boiling point of the liquid coolant, it should be understood that said spring may be loaded and calibrated to permit the piston to leave the cylinder at various desired temperatures, either just below the boiling point or at temperatures considerably higher than the boiling point when desired so as to avoid failures of the element and freezing of the valve open when momentary boiling temperatures may be reached and then subside, as long as the boiling away of the liquid coolant is prevented.

It should here be noted that when the valve is in a closed position, the pressure of the fluid on the underside thereof tends to hold the valve in tight sealing engagement with the upper and lower plane surfaces of the opening 13. Since the valve wing 19 is exposed to the pressure of the fluid and only a portion of the valve wing 17 is exposed to the pressure of the fluid, the valve wing 19 is forced upwardly tightly against the bottom side of the plane surface defining the opening 13 and held in this position by pressure thereon until positively opened by the creation of heat in the heating system and extension of the piston 26 from the cylinder 20.

It should further be noted that the temperature responsive element 30, loosely mounted within the apertured portion 39 of the bridge 37, has bearing engagement with the nibs 41, 41 and rocks thereabout during opening and closing movement of the valve element 11, and that said temperature responsive element is within the limits of said valve element when open and that the loose and rocking mounting thereof on the bridge 37 enables said temperature responsive element to be disposed closely adjacent the valve element in the path of movement thereof, and enables the valve to be jackknifed to the fully open position shown in Figure 4 upon failure of the temperature sensitive element.

In the form of my invention illustrated in Figures 7 and 8, the valve element and power element type of temperature responsive element are shown as being the same as shown in Figures 1 through 6, so a detailed description thereof need not be repeated. In this form of my invention a support casing 10a is shown which is similar to the casing 10 but which has a lower flange 52 extending outwardly from a relatively short cylindrical wall thereof. This affords a simpler type of casing construction utilizing less metal than the casing shown in Figures 1 through 4. The casing 10a has a flat annular portion 12a, the inner margin of which forms a valve opening 13a. The valve opening 13a has spaced inwardly extending nibs 15a—15a, the spaces between which form two diametrically opposed slots (not shown), like the slots 16—16 within which the valve 11 is slidably and pivotally mounted.

The valve element 11 has a connecting lug or ear 53 secured to and extending downwardly from a wing 17a thereof, and connected thereto as by riveting. The ear 53 has a bifurcated inner end portion 54 apertured to receive a transverse pivotal pin 57. A piston 55 of a power element type of temperature sensitive element 56 extends between the furcations of the bifurcated portion 54 and is pivotally connected thereto by the pivotal pin 57. The temperature sensitive element 56 rockingly engages bearing nibs 41a, 41a of a bridge 37a of a cage 37, supporting said temperature sensitive element within the limits of the valve element 11 and in the path of movement thereof, when moving to an open position. Tabs 49a, 49a serve to crimp a spring 43a to the bridge 37a and to maintain tension thereon when an end 44a thereof is connected with the lug 53. The spring 43a is shown as having fewer turns than the spring 43, to enable freer opening of the valve. It also enables the valve element to engage the small diameter convolutions of the tiltable spring upon opening of the valve to a wide open position and thus permitting the valve to jackknife into an open position. It is, however, obvious that the number of turns of the spring may be varied depending upon the required operation conditions of the valve, the size of wire and the required diameter of the coils of the spring.

The piston 55 may fit relatively loosely within the cylinder of the thermo-responsive element 56 and may jackknife within the convolutions of the spring to an open position when excessive engine temperatures are reached. The thermostatic valve in Figures 7 and 8 thus operates in the same manner as that shown in Figures 1 through 4, and besides having the advantages of the first described valve it is also of simpler and cheaper construction than said valve.

It will be understood that modifications and variations may be effected without departing from the scope of the novel concepts of the present invention.

I claim as my invention:

1. In a thermostatic valve of the type having a butterfly valve pivotally supported by a housing having a port opening to be controlled and receiving said valve, the improvement of a housing having a seating portion, a thermostatic control device having a casing pivotally rockable on said seating portion and a member movable in and out of said casing in response to temperature variations, a pivotal driving connection between said movable member and said butterfly valve to angularly position said valve in said port opening thermostatically, and a coiled control spring bottomed against said housing and surrounding said casing of said thermostatic control device and arranged to impart a bias to said driving connection, thereby to urge said valve in one direction and to seat said thermostatic control device, said drive connection being constructed to jackknife to one side of the pivot of the valve between the convolutions of said spring upon said thermostatic control device being subjected to excessive temperature.

2. In a thermostatic valve of the type having a butterfly valve pivotally supported by a housing having a port opening to be controlled and receiving said valve, the improvement of a housing having a seating portion, a thermostatic control device having a casing pivotally rockable on said seating portion and a member movable in and out of said casing in response to temperature variations, a pivotal driving connection between said movable member and said butterfly valve to angularly position said valve in said port opening thermostatically, and a coiled control spring bottomed against said housing and surrounding said casing of said thermostatic control device and arranged to impart a bias to said driving connection, thereby to urge said valve in one direction and to seat said thermostatic control device, said spring comprising spaced conical convolutions and being tiltable as the valve is opened so that said thermostatic casing can rock to a position in a space between adjoining spring convolutions.

HAROLD B. DRAPEAU.

References Cited in the file of this patent

UNITED STATES PATENTS

| Number | Name | Date |
|---|---|---|
| 1,528,786 | Purdy et al. | Mar. 10, 1925 |
| 1,991,392 | Jorgensen et al. | Feb. 19, 1935 |
| 2,157,770 | Mayo | May 9, 1939 |
| 2,255,543 | Fisher | Sept. 9, 1941 |
| 2,265,586 | Vernet | Dec. 9, 1941 |
| 2,356,958 | Wangenheim | Aug. 29, 1944 |
| 2,569,359 | Vellinga | Sept. 25, 1951 |